(12) United States Patent
Takeuchi et al.

(10) Patent No.: US 8,723,472 B2
(45) Date of Patent: May 13, 2014

(54) SERVO CONTROL DEVICE

(75) Inventors: Katsuyoshi Takeuchi, Tokyo (JP);
Hideaki Yamamoto, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 284 days.

(21) Appl. No.: 13/146,363

(22) PCT Filed: Jun. 10, 2010

(86) PCT No.: PCT/JP2010/059871
§ 371 (c)(1),
(2), (4) Date: Jul. 26, 2011

(87) PCT Pub. No.: WO2010/150663
PCT Pub. Date: Dec. 29, 2010

(65) Prior Publication Data
US 2011/0285340 A1 Nov. 24, 2011

(30) Foreign Application Priority Data

Jun. 22, 2009 (JP) ................................. 2009-147730

(51) Int. Cl.
*G05D 23/275* (2006.01)

(52) U.S. Cl.
USPC ........... 318/632; 318/609; 318/610; 318/649; 318/135

(58) Field of Classification Search
USPC ......... 318/560–562, 571, 572, 135, 632, 687, 318/609, 610, 649; 188/378
See application file for complete search history.

(56) References Cited

U.S. PATENT DOCUMENTS

| 4,396,975 | A | * | 8/1983 | Kurakake | 700/41 |
| 4,525,659 | A | * | 6/1985 | Imahashi et al. | 318/649 |
| 5,008,606 | A | * | 4/1991 | Koehler et al. | 318/649 |
| 5,038,090 | A | * | 8/1991 | Kawabata et al. | 318/721 |
| 5,374,883 | A | * | 12/1994 | Morser | 318/605 |
| 5,504,407 | A | * | 4/1996 | Wakui et al. | 318/568.17 |

(Continued)

FOREIGN PATENT DOCUMENTS

| CN | 1523465 A | 8/2004 |
| EP | 1505463 A2 | 2/2005 |

(Continued)

OTHER PUBLICATIONS

Japanese Office Action for Japanese Application No. 2009-147730 mailed Mar. 12, 2013 with English Translation.

(Continued)

*Primary Examiner* — Paul Ip
(74) *Attorney, Agent, or Firm* — Birch, Stewart, Kolasch & Birch, LLP

(57) ABSTRACT

Improved precision is realized in positioning control. Provided is a servo control device that is applied to a numerical control equipment provided with a screw-feeding section that converts rotational movement of a motor to linear movement, a driven section that is linearly moved by the screw-feeding section, and a support member by which the screw-feeding section and the driven section are supported and that controls the motor so as to match a position of the driven section to a positioning instruction, including a support-member-reaction-force compensating section 311 that compensates for vibrations of the driven section due to a vibrational reaction force of the support member, wherein a transfer function provided in the support-member-reaction-force compensating section 311 includes a stiffness term for the driven section.

14 Claims, 12 Drawing Sheets

(56) References Cited

U.S. PATENT DOCUMENTS

| | | |
|---|---|---|
| 5,525,877 A | 6/1996 | Umida |
| 5,660,255 A * | 8/1997 | Schubert et al. ............. 188/378 |
| 5,704,250 A * | 1/1998 | Black ............................ 74/89.3 |
| 5,714,860 A * | 2/1998 | Makinouchi .................. 318/561 |
| 5,757,149 A * | 5/1998 | Sato et al. ..................... 318/135 |
| 5,823,307 A * | 10/1998 | Schubert et al. ............. 188/378 |
| 5,952,804 A | 9/1999 | Hamamura et al. |
| 5,959,427 A * | 9/1999 | Watson ......................... 318/687 |
| 6,170,622 B1 * | 1/2001 | Wakui et al. .................. 188/378 |
| 6,281,643 B1 * | 8/2001 | Ebihara ........................... 318/35 |
| 6,744,233 B1 | 6/2004 | Tsutsui |
| 6,998,810 B2 * | 2/2006 | Kameyama ................... 318/609 |
| 7,063,192 B2 * | 6/2006 | Mayama ....................... 188/378 |
| 7,130,026 B2 * | 10/2006 | Sugawara et al. .............. 355/72 |
| 7,154,242 B2 * | 12/2006 | Asano ............................ 318/560 |
| 7,181,294 B2 | 2/2007 | Nihei et al. |
| 8,508,171 B2 * | 8/2013 | Miyaji .......................... 318/560 |
| 8,513,906 B2 * | 8/2013 | Shilpiekandula et al. .... 318/127 |
| 2002/0060545 A1 | 5/2002 | Inagaki et al. |
| 2004/0114116 A1 * | 6/2004 | Asano ............................. 355/53 |
| 2004/0119428 A1 * | 6/2004 | Abe et al. ...................... 318/254 |
| 2004/0183494 A1 | 9/2004 | Nagaoka et al. |
| 2005/0033460 A1 | 2/2005 | Tanahashi et al. |
| 2005/0052149 A1 * | 3/2005 | Kameyama ................... 318/600 |
| 2005/0061065 A1 * | 3/2005 | Terpstra .......................... 73/117 |
| 2005/0174554 A1 * | 8/2005 | Sugawara et al. .............. 355/72 |
| 2007/0040529 A1 * | 2/2007 | Takebayashi et al. ........ 318/685 |
| 2007/0188117 A1 * | 8/2007 | Shoda et al. .................. 318/135 |
| 2007/0278980 A1 * | 12/2007 | Wilson ......................... 318/573 |
| 2010/0302526 A1 * | 12/2010 | Saiki ............................... 355/72 |
| 2011/0046795 A1 * | 2/2011 | Fujimoto et al. .............. 700/280 |
| 2012/0194121 A1 * | 8/2012 | Miyaji .......................... 318/615 |

FOREIGN PATENT DOCUMENTS

| | | |
|---|---|---|
| JP | 7-110716 A | 4/1995 |
| JP | 8-6644 A | 1/1996 |
| JP | 9-198114 A | 7/1997 |
| JP | 11-184529 A | 7/1999 |
| JP | 11-309649 A | 11/1999 |
| JP | 2000-176788 A | 6/2000 |
| JP | 2000-322116 A | 11/2000 |
| JP | 2001-30136 A | 2/2001 |
| JP | 2001-202136 A | 7/2001 |
| JP | 2004-272883 A | 9/2004 |
| JP | 2005-56254 A | 3/2005 |
| JP | 2007-25961 A | 2/2007 |

OTHER PUBLICATIONS

Hori et al., "Slow Resonance Ratio Control for Vibration Suppression and Disturbance Rejection in Torsional System", IEEE Transactions on Industrial Electronics, vol. 46, No. 1, Feb. 1999, pp. 162-168.

Chinese Office Action for Chinese Patent Application No. 201080005980.4 issued Oct. 29, 2012 with Englsih translation.

Decision to Grant a Patent for European Patent Application No. 10791981.3-1807 issued Oct. 23, 2013.

Decision to Grant a Patent for Taiwanese Patent Application No. 099119705 issued Oct. 30, 2013.

Decision to Grant a Patent for Korean Patent Application No. 10-2011-7017166 issued Nov. 20, 2013 with an English translation.

* cited by examiner

SERVO CONTROL DEVICE

TECHNICAL FIELD

The present invention relates to a servo control device.

BACKGROUND ART

In a servo control device employed in, for example, a machine tool, various control methods have been proposed in order to improve the precision of positioning control. FIG. 13 simply shows, in outline, an example configuration of a machine tool. As shown in FIG. 13, the machine tool is provided with a bed 1 and a table 2 disposed on the bed 1. The table 2 is provided so as to be movable on the bed 1 along an X-axis direction. At a gate-shaped column 3, a cross rail is disposed along a Y-axis direction. A carriage 5 provided with a ram 6 is engaged with the cross rail 4 and is provided so as to be movable along the Y-axis direction.

Movement in the X-axis direction of the table 2 is performed by a ball-screw drive mechanism. Movement in the Y-axis direction of the carriage 5 provided with the ram 6 is also performed by another ball-screw drive mechanism installed at the column 3.

With a relatively large machine tool, such as the one shown in FIG. 13, high-precision positioning control of the carriage 5 and velocity control of the table 2 are required; however, during machining, low-frequency vibrations occur at the column, etc. due to movement of the cross rail 4, the carriage 5, and the ram 6, and there is a problem in that the positioning control of the carriage 5 and the ram 6 cannot be performed accurately.

In order to solve such a problem, for example, it has been proposed to model a servo system or a machine system and to perform feedforward compensation using a transfer function having an inverse of that model (for example, see Patent Literature 1).

CITATION LIST

Patent Literature

{PTL 1} Japanese Unexamined Patent Application, Publication No. 2007-25961

SUMMARY OF INVENTION

Technical Problem

With the invention disclosed in Patent Literature 1, although the position of the carriage 5 can be compensated for vibrations of the column itself, there is a problem in that it is not possible to cope with characteristic vibrations of the carriage 5 caused by the vibrations of the column, and it is difficult to maintain a desired precision for the positioning control.

Furthermore, with the invention disclosed in Patent Literature 1, it is necessary to identify machine constants in a transfer function for the feedforward compensation control; however, it is difficult to accurately identify such machine constants, and there is a problem in that, without appropriately identifying the machine constants, the desired precision cannot be maintained even if the feedforward compensation control is performed.

The present invention has been conceived in view of the above-described circumstances, and an object thereof is to provide a servo control device that is capable of realizing improved precision of positioning control.

Solution to Problem

In order to solve the above-described problems, the present invention employs the following solutions.

The present invention provides a servo control device that is applied to a numerical control equipment provided with a screw-feeding section that converts rotational movement of a motor to linear movement, a driven section that is linearly moved by the screw-feeding section, and a support member by which the screw-feeding section and the driven section are supported and that controls the motor so as to match a position of the driven section to a positioning instruction, including a support-member-reaction-force compensating section that compensates for vibrations of the driven section due to vibrational reaction force of the support member, wherein a transfer function provided in the support-member-reaction-force compensating section includes a stiffness term for the driven section.

By employing such a configuration, with the support-member-reaction-force compensating section, it becomes possible to compensate for positioning-control errors due to the vibrations of the driven part caused by the vibration of the support member. Accordingly, it becomes possible to improve the precision of positioning control of the driven section. Since the transfer function provided in the support-member-reaction-force compensating section includes the stiffness term for the driven section, it is possible to estimate a level at which the vibrations of the support member are transmitted to the driven section with considerable precision.

In the servo control system described above, the support-member-reaction-force compensating section may be provided in a feedforward control system for velocity control of the motor.

In this way, by providing the support-member-reaction-force compensating section in the feedforward control system for controlling the motor velocity, it becomes possible to accurately perform compensation for the motor velocity.

In the servo control system described above, the transfer function provided in the support-member-reaction-force compensating section may include a stiffness term for the support member, and the stiffness term for the support member may be identified on the basis of a vibration resonance frequency of vibrations generated when an impact is applied to the support member or the driven section.

Since the vibrational resonance frequency is used in this way, for example, in comparison with a method of identifying from the relationship between the force and the deformation, a greater measurement precision can be obtained, and a greater identification precision can be obtained.

The servo control system described above may include a constant identifying section that identifies the stiffness term for the support member, wherein the constant identifying section may include an impact generating section that vibrates the driven section by applying an impact to the driven section; a vibration detecting section that detects the vibrations of the driven section or the support member when the impact is applied thereto; and a support-member-stiffness-term identifying section that calculates a resonance frequency of the driven section from a vibration signal detected by the vibration detecting section and that identifies the stiffness term for the support member from this resonance frequency.

The driven section is vibrated by applying an impact to the driven section in this way, and the stiffness term for the support member is identified on the basis of the state of these vibrations; therefore, it is possible to increase the reliability of identification of the stiffness term for the support member.

In the servo control system described above, the transfer function provided in the support-member-reaction-force compensating section may include a viscosity term for the support member, and the viscosity term of the support member may be identified on the basis of attenuation of the vibrations generated when the support member or the driven section is vibrated by applying an impact thereto.

In this way, the viscosity term for the support member is identified on the basis of attenuation of the vibrations; therefore, the viscosity term for the support member can easily be identified.

The servo control system described above may include a constant identifying section that identifies constants included in the transfer function provided in the support-member-reaction-force compensating section, wherein the constant identifying section may include an impact generating section that vibrates the driven section by applying an impact to the driven section; a vibration detecting section that detects the vibrations of the driven section or the support member when the impact is applied thereto; and a support-member-viscosity-term identifying section that calculates an attenuation rate of the vibrations of the driven section from a vibration signal detected by the vibration detecting section and that identifies the viscosity term for the support member from the attenuation rate of the vibrations.

In this way, the driven section is vibrated by applying an impact thereto, and the viscosity term for the support member is identified on the basis of the state of the vibrations; therefore, it is possible to increase the reliability of identification of the viscosity term for the support member.

In the servo control system described above, the impact generating section may vibrate the driven section by moving the driven section at or above a predetermined acceleration.

In this way, the vibrations are generated by applying an impact to the driven section by moving the driven section; therefore, it becomes possible to check the conditions of the vibrations in a mode that is closer to the actual operation.

In the servo control system described above, when amplitudes of the vibrations of the driven section detected by the vibration detecting section exceed a predetermined threshold after the constants are identified, the constant identifying section may adjust the constants on the basis of the vibration signal detected by the vibration detecting section.

In this way, whether or not the constants are appropriate is checked after the constants are identified, and, if they are not appropriate, the constants are adjusted until appropriate values are set; therefore, it is possible to increase the identification precision of the constants.

In the servo control system described above, during a period in which the numerical control equipment is being driven, the constant identifying section may compare the vibration signal detected by the vibration detecting section with an estimated vibration signal calculated from a model in the support-member-reaction-force compensating section and may adjust machine constants of the transfer function provided in the support-member-reaction-force compensating section on the basis of this comparison.

With such a configuration, because the constants are adjusted even during a period in which the numerical control equipment is being driven, it is possible to always set the constants at appropriate values. Accordingly, it is possible to improve the precision of positioning control of the driven section.

Advantageous Effects of Invention

With the present invention, an advantage is afforded in that precision of positioning control can be improved.

DESCRIPTION OF EMBODIMENTS

Embodiments of a servo control device of the present invention, as applied to a machine tool (numerical control equipment) shown in FIG. 13, will be described below.

First Embodiment

Figure 13:
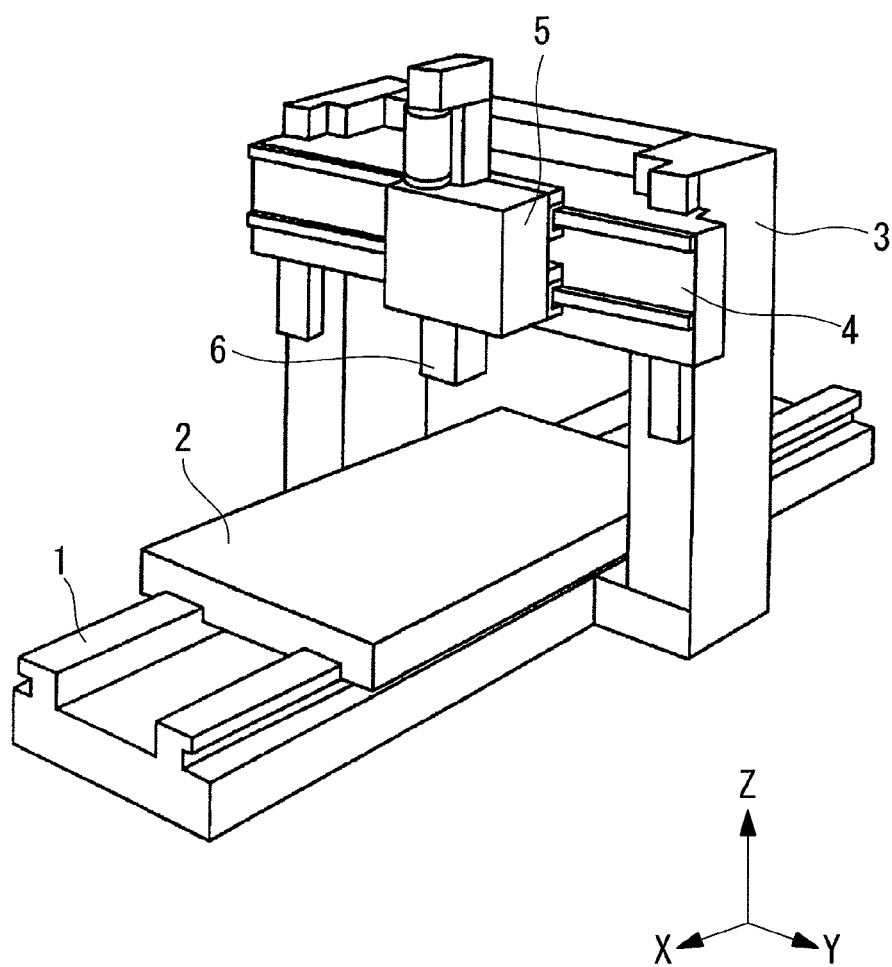
FIG. 13 is a diagram showing, in outline, the configuration of a machine tool to which the servo control device according to the first embodiment of the present invention is applied.

FIG. 13 is a diagram showing, in outline, the configuration of a machine tool to which a servo control device according to a first embodiment of the present invention is applied. As shown in FIG. 13, the machine tool is provided with a bed 1 and a table 2 that is disposed on the bed 1 and that is movable along an X-axis direction. A gate-shaped column (support member) 3 is disposed so as to cross over the table 2. A cross rail is attached to the column 3 in a Y-axis direction, and the movement of a carriage (driven portion) 5 on this cross rail makes the carriage 5 movable along the Y-axis direction. The carriage 5 is provided with a ram 6 that is movable along a Z-axis direction. A machining tip that performs cutting processing, etc. is attached to a distal end of the ram 6. The purpose of this embodiment is to control the position of the carriage 5 so that the position of the machining tip in the Y-axis of this ram 6 matches an instructed position θ.

Figure 1:
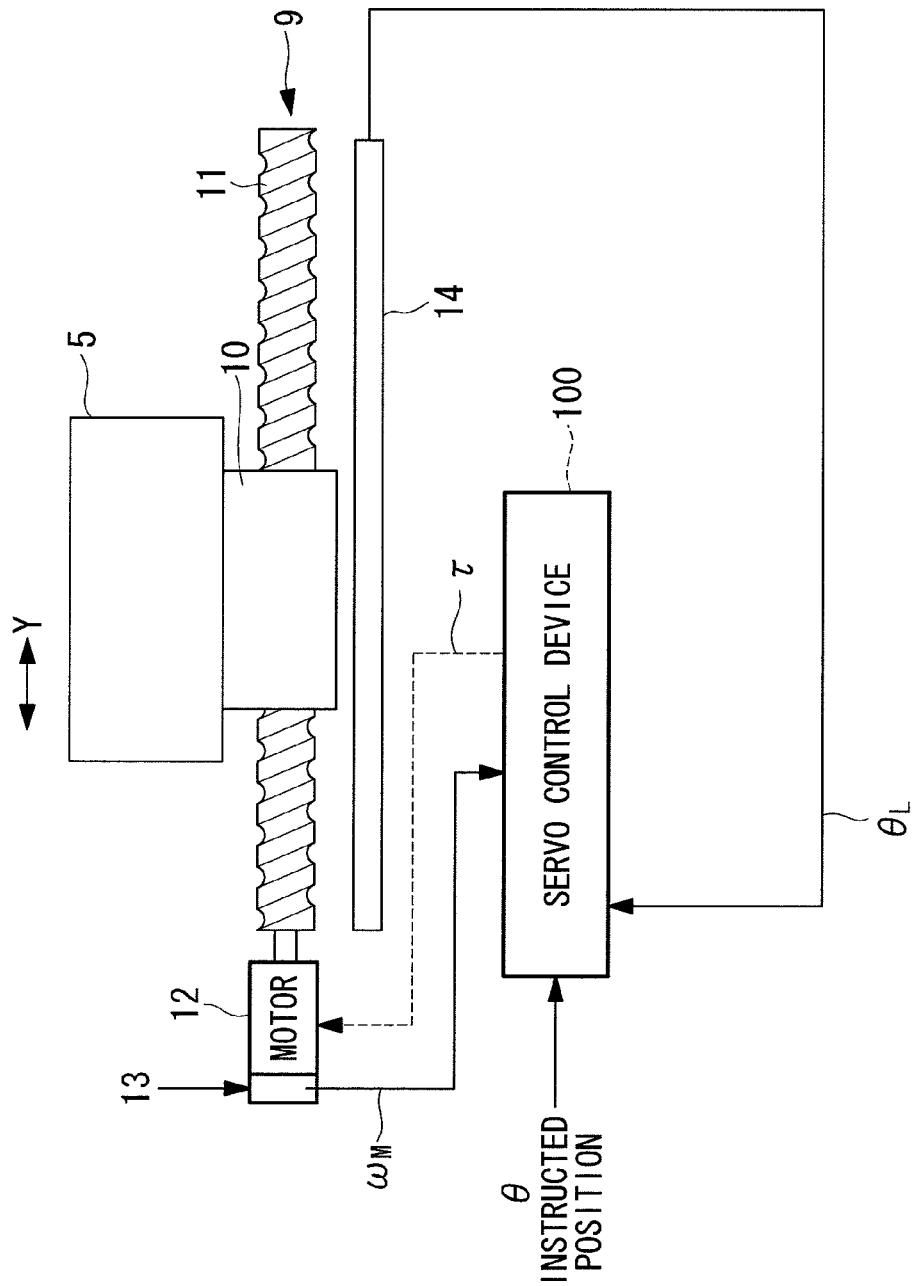
FIG. 1 is a diagram showing, in outline, the configuration of the control-target equipment of a servo control device according to a first embodiment of the present invention.

FIG. 1 shows, in outline, the configuration of control-target equipment of the servo control device according to this embodiment. As shown in FIG. 1, the control-target equipment is a ball-screw drive mechanism of the machine tool that converts rotational movement of a motor 12 to linear movement with a ball-screw feeding section (screw feeding section) 9 formed of a ball-screw nut 10 and a ball-screw shaft 11 and that linearly moves (moves in the Y-axis direction) the carriage 5, which is the load. A motor encoder 13 that detects and outputs motor velocity $\omega_M$ is disposed at the motor 12. A linear scale 14 detects and outputs a load position $\theta_L$ which indicates the position of the carriage 5. The ball-screw drive mechanism is configured so that, when the motor 12 is rotationally driven and the ball-screw shaft 11 is rotated, the ball-screw nut 10 and the carriage 5, which is fixedly connected to the ball-screw nut 10, are linearly moved.

Figure 2:
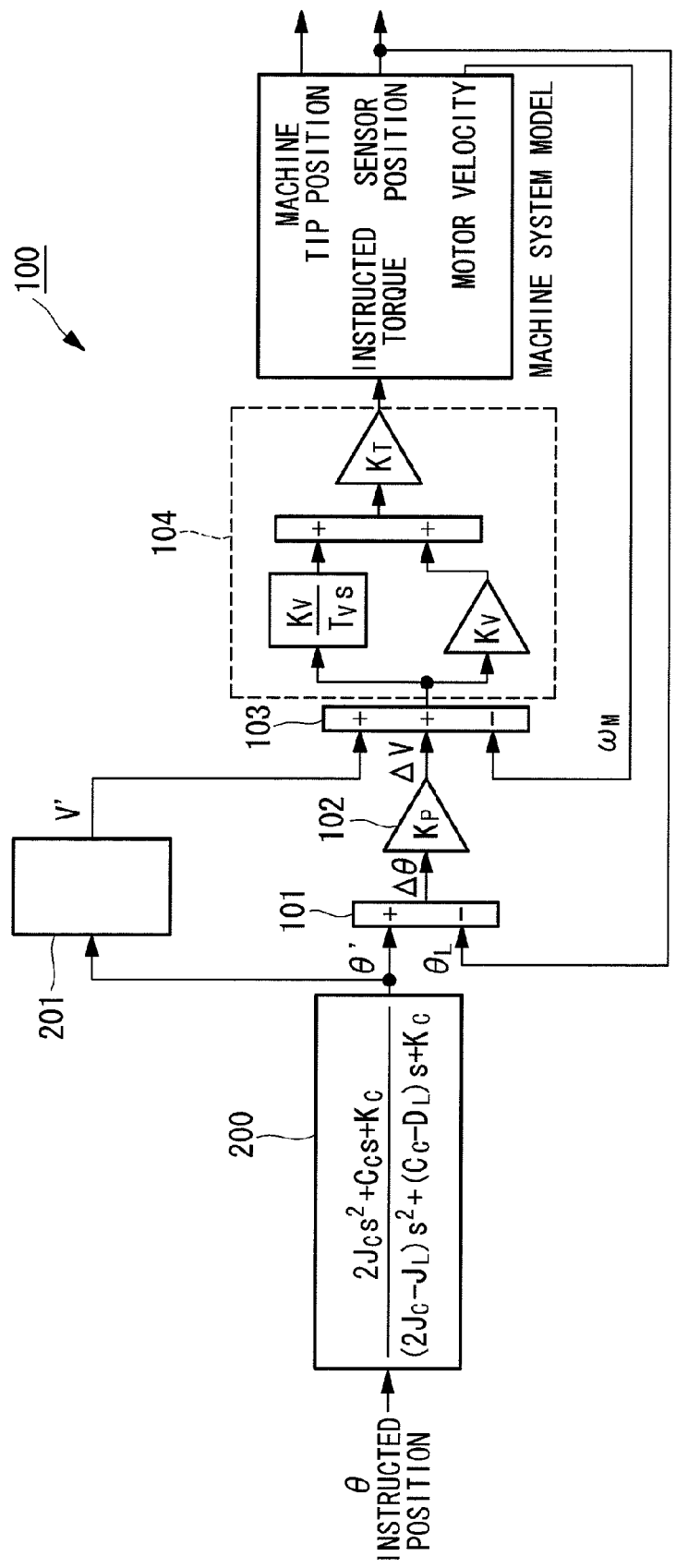
FIG. 2 is a diagram showing a block diagram of the servo control device according to the first embodiment of the present invention.

FIG. 2 is a diagram showing a block diagram of the servo control device according to this embodiment. A servo control device 100 according to this embodiment is a device that calculates an instructed torque $\tau$ for matching the position of the machining tip in the Y-axis direction of the ram 6, which is attached to the carriage 5, with the instructed position $\theta$ and that outputs this instructed torque $\tau$ as an output signal to the motor 12.

As shown in FIG. 13, the carriage 5 is mounted on the column 3. When the carriage 5 moves in the Y-axis direction or the ram 6 moves in the Z-axis direction during cutting and processing, etc., vibrations occur in the column 3, and these vibrations affect the precision of positioning control of the carriage 5 or the ram 6. The servo control device 100 according to this embodiment is provided with a machine-deflection compensating section 200 that compensates for positioning-control errors caused by such vibrations of the column 3. Furthermore, a velocity feedforward section 201 that compensates for the positioning-error factors, such as "strain", "deflection", "viscosity", etc., associated with the motor 12 and the carriage 5, is provided to improve the precision of the positioning control of the carriage 5. Details of the machine-deflection compensating section 200 and the velocity feedforward section 201 will be described later.

As shown in FIG. 2, the servo control device 100 includes the machine-deflection compensating section 200, the velocity feedforward section 201, a subtraction section 101, a multiplication section 102, a subtraction section 103, and a proportional-integral calculation section 104.

The machine-deflection compensating section 200 compensates the instructed position $\theta$ with a transfer function, described later, and outputs a compensated instructed position $\theta'$. The subtraction section 101 outputs a positioning difference $\Delta\theta$, which is the difference between the compensated column instructed position $\theta'$ and the load position $\theta_L$. The multiplication section 102 multiplies the positioning difference $\Delta\theta$ by a positioning loop gain $K_P$ and outputs a velocity difference $\Delta V$. The subtraction section 103 outputs an instructed velocity V, which is a value obtained by subtracting the motor velocity $\omega_M$ from a value obtained by adding a compensated velocity V' output from the velocity feedforward section 201 to the velocity difference $\Delta\theta$. The proportional integral calculation section 104 proportionally integrates the instructed velocity V and outputs the instructed torque $\tau$. The proportional integral calculation section 104 obtains the instructed torque $\tau$ by performing a calculation $\tau=VK_T\{K_v(1+(1/T_v s))\}$, using a velocity loop gain $K_v$, an integration time constant $T_v$, and a torque constant $K_T$.

This instructed torque $\tau$ is supplied to the control-target equipment shown in FIG. 2, and various sections are controlled on the basis of this instructed torque $\tau$. For example, the motor 12 is rotationally driven by supplying current from a current controller (not shown) in accordance with the instructed torque $\tau$. In this case, although an illustration thereof is omitted, the current is feedback controlled so that the current is set at a current value in accordance with the instructed torque $\tau$. The rotational movement of the motor 12 is converted to the linear movement by the ball-screw feeding section 9, and, as a result, the ball-screw nut 10 threaded to the ball-screw feeding section 9 is linearly moved, the carriage 5 secured to this ball-screw nut 10 moves with the ball-screw nut 10, and the position of the machining tip attached to the distal end of the ram 6 provided at the carriage 5 is moved to the instructed position $\theta$.

Figure 3:
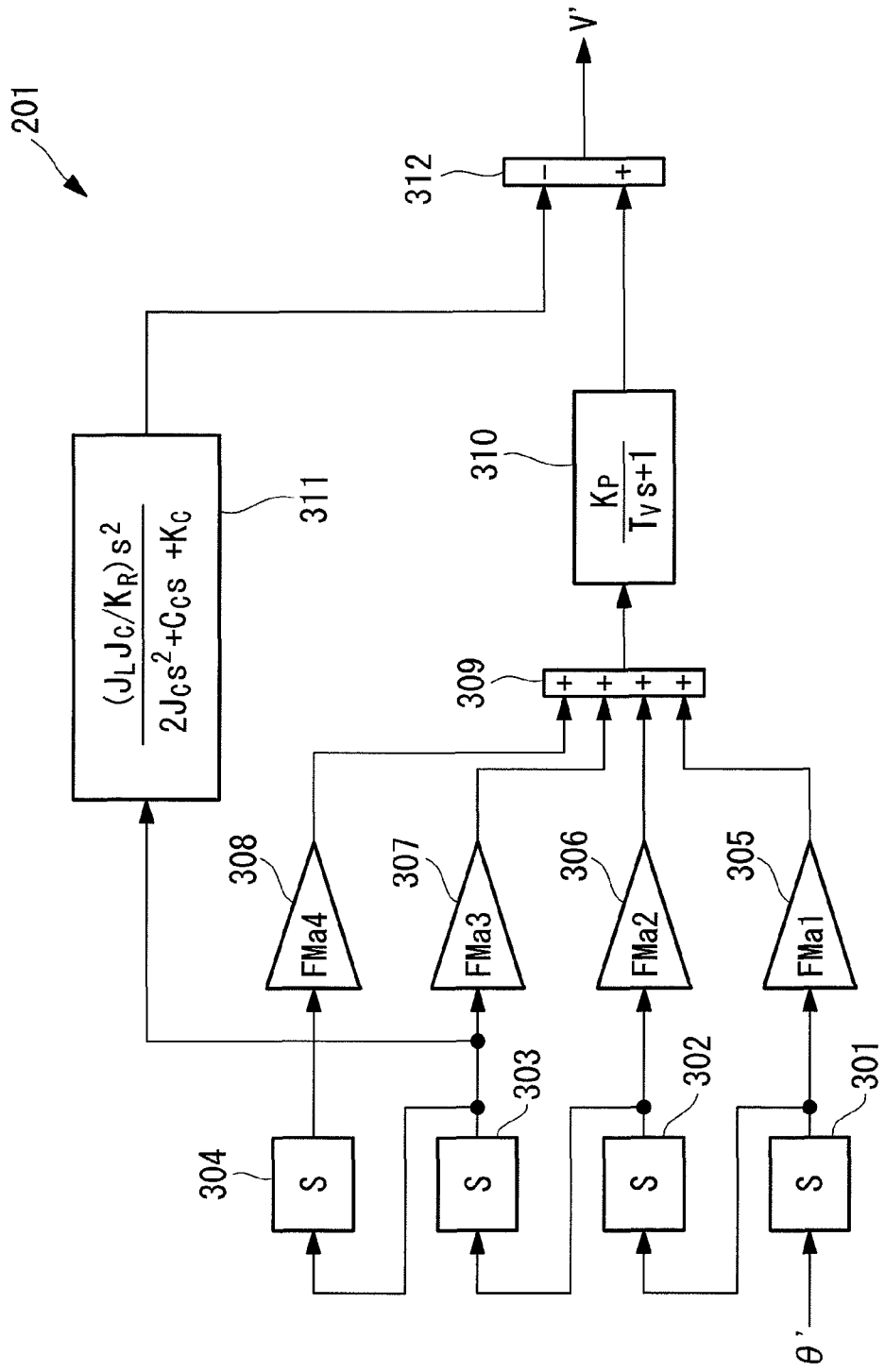
FIG. 3 is a diagram showing a block diagram of a velocity feedforward section shown in FIG. 2.

Next, the velocity feedforward section 201 will be described. As shown in FIG. 3, the velocity feedforward section 201 is provided with a first-order-differential-term calculating section 301, a second-order-differential-term calculating section 302, a third-order-differential-term calculating section 303, a fourth-order-differential-term calculating section 304, a multiplication section 305 that multiplies a first-order differential term by a first-order differential coefficient, a multiplication section 306 that multiplies a second-order differential term by a second-order differential coefficient, a multiplication section 307 that multiplies a third-order differential term by a third-order differential coefficient, a multiplication section 308 that multiplies a fourth-order differential term by a fourth-order differential coefficient, an addition section 309, a velocity loop compensating section 310, a column-reaction-force compensating section (support-member reaction force compensating section) 311, and a subtraction section 312. In FIG. 3, s is a Laplacian operator (differential operator).

The above-described first-order differential coefficient to fourth-order differential coefficient are set in transfer functions of inverse models of the torque and the velocity in machine system models. A transfer function of the above-described velocity loop compensating section 310 is expressed as $\{K_P/(1+T_v s)\}$, using the positioning loop gain $K_P$ and the integration time constant $T_v$; and a transfer function of the column-reaction-force compensating section 311 is expressed as $\{J_C J_L/K_R)s^2/(2J_C s^2+C_C s+K_C)\}$, using inertia $J_C$ of the column, inertia $J_L$ of the carriage and the ram, column viscosity $C_C$, feeding-system stiffness $K_R$, and spring stiffness $K_C$ of the column.

At the velocity feedforward section 201, when the instructed position $\theta'$, for which the positioning compensation has been performed by the machine-deflection compensation section 200, is input, the first-order differential term that has been multiplied by the first-order differential coefficient, the second-order differential term that has been multiplied by the second-order differential coefficient, the third-order differential term that has been multiplied by the third-order differential coefficient, and the fourth-order differential term that has been multiplied by the fourth-order differential coefficient are individually input to the addition section 309; these different differential coefficients are summed thereby and supplied to the velocity loop compensating section 310. At the velocity loop compensating section 310, the positioning compensation expressed by the above-described transfer functions is performed, and then, the result is output to the subtraction section 312.

The third-order differential term output from the third-order-differential-term calculating section 303 is also input to the column-reaction-force compensating section 311 and is output to the subtraction section 312, after the positioning compensation expressed by the above-described transfer function is performed. At the subtraction section 312, the amount of positioning compensation by the column-reaction-force compensating section 311 is subtracted from the output from the velocity loop compensating section 310 to calculate the compensated velocity V', and this compensated velocity V' is output to the subtraction section 103 in FIG. 2.

With the servo control device shown in FIG. 2, the positioning-error factors, such as "distortion", "deflection", and "viscosity" in the motor 12 and the carriage 5, which are point masses, are compensated for by adding the compensated velocity V' to the velocity difference ΔV at the subtraction section 103. As a result, the precision of the positioning control of the carriage 5 is improved.

Next, the machine-deflection compensating section 200 shown in FIG. 2, which is one of the main features of this embodiment, and the column-reaction-force compensating section 311 shown in FIG. 3 will be described.

As described above, the purpose of the servo control device 100 according to this embodiment is to prevent deterioration of the precision of the positioning control due to the vibrations of the carriage 5 caused by the vibrations of the column 3, when the column 3 vibrates due to the movement of the carriage 5 and the ram 6.

When the column 3 vibrates, the positioning control of the carriage 5 must be performed in consideration of the vibrations of the column 3 itself, and the positioning control of the carriage 5 must also be performed in consideration of the vibrations of the carriage 5 and the ram 6 due to the reaction force of the vibrations of the column 3.

That is, when the column 3 and the carriage 5 both have high stiffness, the carriage 5 vibrates with the column 3 at the same amplitude and the same frequency therewith. Therefore, in this case, characteristic vibrations of the carriage 5 need not be considered, and only the positioning errors due to the vibrations of the column 3 need to be considered.

As opposed to this, when the stiffness of the carriage 5 is low, the carriage 5 vibrates due to the reaction force of the column 3, and, in addition, these vibrations are not necessarily the same as the vibrations of the column 3; therefore, the carriage 5 vibrates with a different period and phase from the column 3. In this case, not only the positioning errors due to the vibrations of the column 3 but also positioning errors due to the characteristic vibrations of the carriage 5 caused by the reaction force of the vibrations of the column 3 need to be considered, and the positioning-control errors involved therein need to be compensated for.

In this way, the present invention focuses on the characteristic vibrations of the carriage 5 caused by the reaction force of the vibrations of the column 3, and one feature thereof is the compensation for the positioning errors due to these characteristic vibrations of the carriage 5.

Accordingly, the servo control device 100 according to this embodiment includes a compensation model for compensating for positioning errors due to not only the vibrations of the column 3 itself described above, but also the vibrations of the carriage 5 caused by the reaction force of the vibrations of the column 3. This compensation model is the column-reaction-force compensating section 311 shown in FIG. 3.

In this way, the servo control device 100 according to this embodiment includes two compensation models constituted of the machine-deflection compensating section 200 that compensates for the positioning-control errors due to the vibrations of the column 3 itself, and the column-reaction-force compensating section 311 that compensates for the positioning errors due to the vibrations of the carriage 5 caused by the reaction force of the vibrations of the column 3. By including the two compensation models in this way, it is possible to efficiently eliminate positioning-control errors due to the vibrations of the column, and it is possible to improve the precision of the positioning control in the Y-axis direction of the machine tool shown in FIG. 13.

Next, derivation processes of the transfer functions of the machine-deflection compensating section 200 and the column-reaction-force compensating section 311, described above, will be briefly described.

Figure 4:
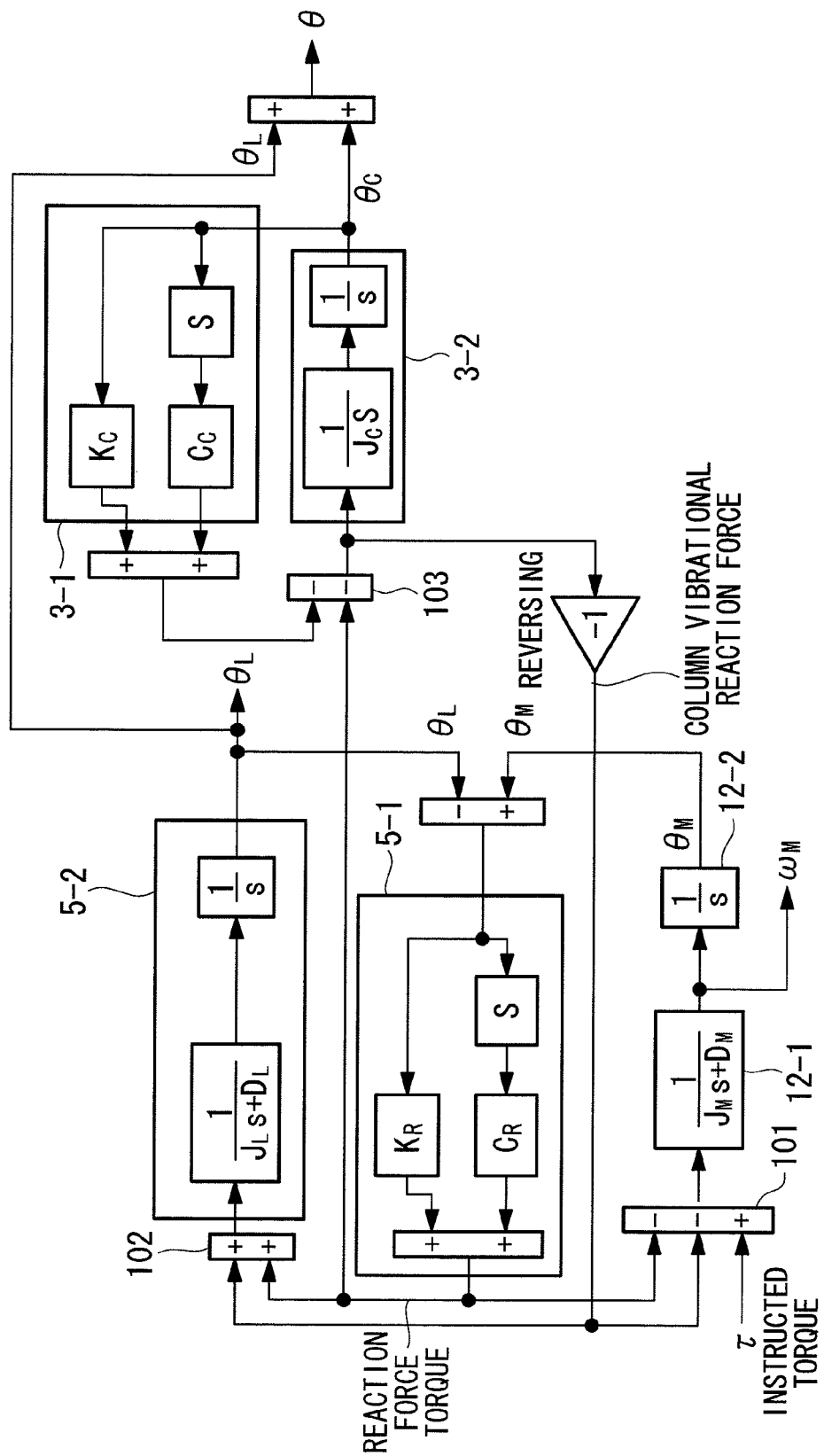
FIG. 4 is a diagram showing a machine system model of the control target equipment including a column.

FIG. 4 is a diagram showing a machine system model of the control-target equipment including the column 3. As shown in FIG. 4, in this embodiment, the machine system model is specified as a machine system model with three point masses, wherein the motor 12, the carriage 5, which is a load, and the column 3 serve as the point masses.

As shown in FIG. 4, when properties of the motor 12 are modeled and expressed as transfer functions, they are represented by Block 12-1 and Block 12-2. $J_M$ indicates the motor inertia and $D_M$ indicates the motor viscosity. Block 12-1 outputs the motor velocity $\omega_M$, and Block 12-2 outputs the motor position $\theta_M$.

When the properties of the carriage 5, which is the load, are modeled and expressed as transfer functions, they are represented by Block 5-1 and Block 5-2. $\theta_M$, $\theta_L$, $C_R$, $K_R$, $J_L$, and $D_L$ indicate the motor position, the load position, translational attenuation of the feeding system, feeding-system stiffness, carriage-ram inertia, and load viscosity (carriage viscosity), respectively.

Upon receiving a difference ($\theta_M-\theta_L$) between the motor position $\theta_M$ and the load position $\theta_L$, the Block 5-1 outputs a reaction force torque. Upon receiving a value obtained by summing this reaction force torque and the reaction force of the column vibrations, the Block 5-2 outputs the load position $\theta_L$.

When properties of the column 3 are modeled and expressed as transfer functions, they are represented by Block 3-1 and Block 3-2. $J_C$ indicates column inertia, $C_C$ indicates column viscosity, and $K_C$ indicates column stiffness.

Next, on the basis of the machine system model shown in FIG. 4, derivation methods will be described for a transfer function of the machine-deflection compensating section 200 and a transfer function of the column-reaction-force compensating section 311 provided in the velocity feedforward section 201, which are shown in FIG. 2.

First, in the machine system model shown in FIG. 4, motion equations for Block 101, Block 102, and Block 103 are indicated by the following expressions (1) to (3), respectively.

$$\tau-(\theta_M-\theta_L)K_R+\theta_C J_C s^2=\theta_M(J_M s^2+D_M s) \quad (1)$$

$$(\theta_M-\theta_L)K_R-\theta_C J_C s^2=\theta_L(J_L s^2+D_L s) \quad (2)$$

$$-(\theta_M-\theta_L)K_R-\theta_C(K_C+C_C s)=\theta_C J_C s^2 \quad (3)$$

The following expression (4) is derived by summing the above-described expressions (2) and (3).

$$-\theta_C J_C s^2-\theta_C(K_C+C_C s)=\theta_L(J_L s^2+D_L s)+\theta_C J_C s^2$$

$$-\theta_L(J_L s^2+D_L s)=\theta_C(2J_C s^2+C_C s+K_C) \quad (4)$$

Since the machine tip position θ is $\theta=\theta_L+\theta_C$, $$\theta_C=\theta-\theta_L \quad (5)$$

From the above-described expressions (4) and (5), the following expression (6) is finally obtained.

$$-(J_L s^2+D_L s)\theta_L=(\theta-\theta_L)\cdot(2J_C s^2+C_C s+K_C)$$

$$\{(2J_C s^2+C_C s+K_C)-(J_L s^2+D_L s)\}\theta_L=\theta(2J_C s^2+C_C s+K_C)$$

$$\theta_L=\theta(2J_C s^2+C_C s+K_C)/\{(2J_C-J_L)s^2+(C_C-D_L)s+K_C\} \quad (6)$$

Here, in order to match the machine tip position with the instructed position θ, the carriage position $θ_L$ detected by the linear scale (position sensor) 14 needs to be shifted in accordance with expression (6). Therefore, the machine-deflection compensating section 200 is represented (see FIG. 2) by the following expression (7).

$$G_1(s) = (2J_Cs^2 + C_Cs + K_C)/\{(2J_C - J_L)s^2 + (C_C - D_L)s + K_C\} \quad (7)$$

Next, the transfer function of the column-reaction-force compensating section 311 in the velocity feedforward section 201 will be described.

By determining the relationship between the detected position $θ_L$ of the carriage 5 and the motor velocity $θ_Ms$ from the machine system model shown in FIG. 4, the following expression (8) is derived from the above-described expression (2).

$$θ_C = \{(θ_M - θ_L)K_R - θ_L J_L s^2\}/J_C s^2 \quad (8)$$

The following expression (9) is derived from the above-described expressions (3) and (8).

$$-(θ_M - θ_L)K_R - [\{(θ_M - θ_L)K_R - θ_L J_L s^2\}/J_C s^2]*(K_C + C_C s)$$

$$= (θ_M - θ_L)K_R - θ_L J_L s^2 \quad (9)$$

Furthermore, $$θ_M[-2K_R - K_R(K_C + C_C s)/J_C s^2]$$

$$= θ_L[-2k_R - J_L s^2 - (J_L/J_C)*(K_C - C_C s) - K_R/J_C s^2*(K_C + C_C s)]$$

Rearranging these, $$θ_M[-2K_R J_C s^2 - K_R(K_C + C_C s)]$$

$$= θ_L[-2K_R J_C s^2 - J_L s^2 * J_C s^2 - J_L*(K_C + C_C s)s^2 - K_R*(K_C + C_C s)]$$

Therefore, the following expression (10) is obtained.

{Eq. 1}

$$θ_M = θ_L\left(1 + \frac{J_L J_C s^4 + J_L(K_C + C_C s)s^2}{2K_R J_C s^2 + K_R(K_C + C_C s)}\right) \quad (10)$$

Here, in order to extract only the column-reaction-force compensation, by subtracting the following expression (11), which corresponds to compensation in a two-mass system in the above-described expression (2), from the above described expression (10), expression (12) is obtained.

$$θ_M s = θ_L s[(J_L/K_R)s^2 + 1] \quad (11)$$

{Eq. 2}

$$θ_M = θ_L\left(\frac{-(J_L J_C / K_R)s^4}{2J_C s^2 + C_C s + K_C}\right) \quad (12)$$

In order to obtain the motor velocity, both sides are multiplied by the Laplacian coefficient, and expression (13) is obtained.

{Eq. 3}

$$θ_M s = θ_L s\left(\frac{-(J_L J_C / K_R)s^4}{2J_C s^2 + C_C s + K_C}\right) \quad (13)$$

Figure 5:
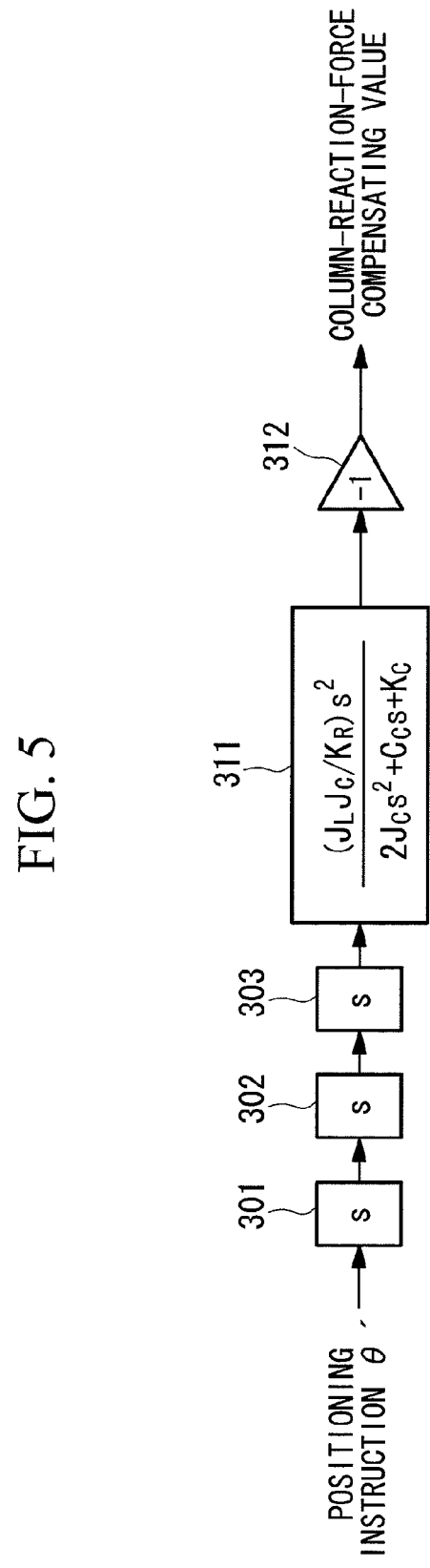
FIG. 5 is a diagram showing components related to a column-reaction-force compensating section, extracted from components constituting the velocity feedforward section.

Then, the above-described expression (13) is applied to the block diagram of the column-reaction-force compensating section 311 shown in FIG. 3, that is, the block diagram shown in FIG. 5, and the transfer function of the column-reaction-force compensating section is obtained as the following expression (14).

{Eq. 4}

$$G_2(S) = \frac{(J_L J_C / K_R)s^2}{2J_C s^2 + C_C s + K_C} \quad (14)$$

Next, identification methods of machine constants used in the transfer function of the above-described machine-deflection compensating section 200 and the transfer function of the column-reaction-force compensating section 311 in the velocity feedforward section 201 will be described.

First, as shown in the above-described expression (7), the transfer function $G_1(s)$ of the machine-deflection compensating section 200 and the transfer function $G_2(s)$ of the column-reaction-force compensating section 311 in the velocity feedforward section 201 include six machine constants, the column inertia $J_C$, the column viscosity $C_C$, the column stiffness $K_C$, the carriage-ram inertia $J_L$, the load viscosity $D_L$, and the feeding-system stiffness $K_R$. Among these, the column inertia $J_C$, the column viscosity $C_C$, the column stiffness $K_C$, and the feeding-system stiffness $K_R$ are variable constants, and it is desirable that identification methods for these be simple.

Additionally, among these four machine constants, the column inertia $J_C$ can be estimated because the machine weight of each section is known, and identification thereof is not necessary. The feeding-system stiffness $K_R$ can also be estimated from a theoretical value of the ball-screw stiffness, and identification thereof is not necessary.

Therefore, by determining the remaining column viscosity $C_C$ and the column stiffness $K_C$ by performing identification thereof, all of machine constants for the individual compensating sections can be determined.

Identification methods for the above-described column viscosity $C_C$ and the column stiffness $K_C$ will be described below.

In this embodiment, an impact is applied to the column 3, and the column viscosity $C_C$ and the column stiffness $K_C$ are identified from response vibrations to this impact.

The identification of the column stiffness $K_C$ is performed on the basis of a resonance frequency of vibrations generated at the carriage 5 when the impact is applied to the column 3.

Accordingly, derivation of a computational expression for calculating the column stiffness $K_C$ from the resonance frequency will be described first.

In the machine system model shown in FIG. 4, a calculation expression for the column stiffness $K_C$ can be obtained from the following expressions (15) and (16), which are the above-described expressions (2) and (3) in which $θ_M$ is set to zero. It is assumed that the motor 12 does not move due to the reaction force of the column 3 while resonating.

$$-θ_L K_R - θ_C J_C s^2 = θ_L J_L s^2 \quad (15)$$

$$θ_L K_R - θ_C(K_C + C_C s) = θ_C J_C s^2 \quad (16)$$

From expression (15), $$θ_L = -θ_C J_C s^2/(J_L s^2 + K_R) \quad (17)$$

From expressions (16) and (17), $$-\theta_c(J_C s^2 K_R)/(J_L s^2 + K_R) - \theta_c(K_C + C_C s) = \theta_c J_C s^2$$

$$J_C s^2 + C_C s + K_C + (J_C s^2 K_R)/(J_L s^2 + K_R) = 0$$

$$J_C s^2 (J_L s^2 + K_R) + (K_C + C_C s)*(J_L s^2 + K_R) + J_C s^2 K_R = 0$$

$$J_C J_L s^4 + C_C J_L s^3 + (2J_C K_R + J_L K_C) s^2 + C_C K_R s + K_R K_C = 0 \quad (18)$$

At this time, by keeping only terms that are not related to the resonance frequency ($C_C$ is not related to the resonance), and by setting s to jω, the following expression (19) is obtained.

$$J_C J_L \omega^4 - (2J_C K_R + J_L K_C) \omega^2 + K_R K_C = 0 \quad (19)$$

By solving the above-described expression (19) and, additionally, by rearranging it to an expression regarding the column stiffness $K_C$, the following expression (20) is obtained.

$$K_C = (8J_C^2 J_L K_R \omega^2 - (2J_C J_L)^2 \omega^4 / (-4J_C J_L^2) \omega^2 + 4J_C J_L K_R) \quad (20)$$

By expressing the above-described expression (20) in terms of the resonance frequency q, the following expression (21) is obtained.

$$K_C = J_C(8K_R q^2 - J_L q^4)/(K_R - J_L q^2) \quad (21)$$

In the above-described expression (21), $K_R$ is the feeding-system stiffness, $J_L$ is the carriage inertia, $J_C$ is the column inertia, and the q is the column resonance frequency; among these, the column inertia $J_C$, the carriage inertia $J_L$, and the feeding-system stiffness $K_R$ are known. Therefore, by detecting the column resonance frequency, the column stiffness $K_C$ can be identified in accordance with the above-described expression (21).

Next, the procedure for actually identifying the column stiffness $K_C$ using the above-described expression (21) will be described.

Figure 6:
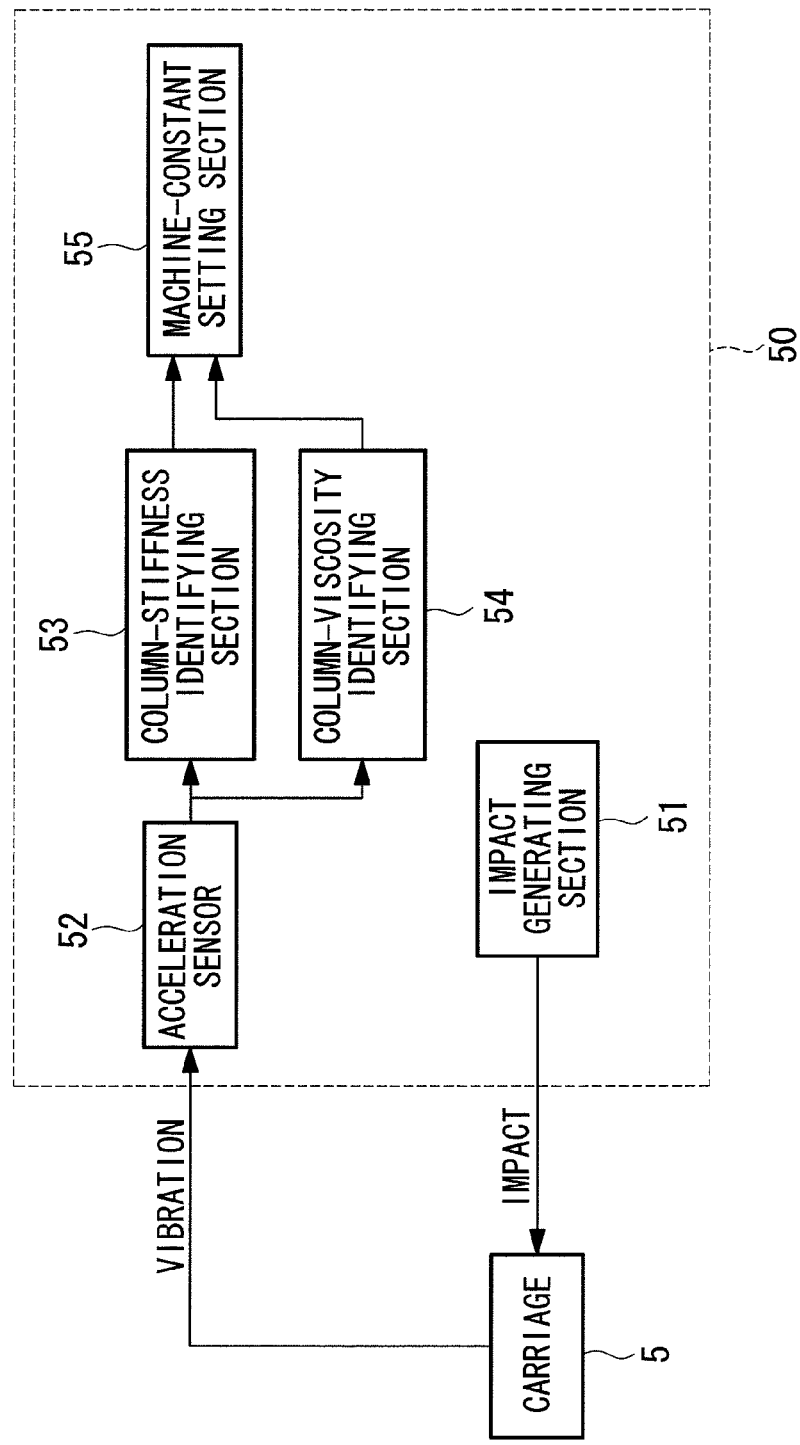
FIG. 6 is a diagram showing, in outline, the configuration of a constant identifying section according to the first embodiment of the present invention.

FIG. 6 is a diagram showing, in outline, the configuration of the constant identifying section 50. As shown in FIG. 6, the constant identifying section 50 is provided with an impact generating section 51, an acceleration sensor (vibration detection section) 52, a column-stiffness identifying section (support-member-stiffness-term identifying section) 53, a column-viscosity identifying section (support-member-viscosity-term identifying section) 54, and a machine-constant setting section 55.

The impact generating section 51, for example, applies a predetermined impact in the Y-axis direction to the carriage 5. The predetermined impact is, for example, an impact like a step response. In this embodiment, as shown in FIG. 7, by moving the carriage 5 and the ram 6 on the Y-Z plane so as to draw a substantially rectangular shape, the impact in the Y-axis direction is applied to the carriage 5.

Figure 7:
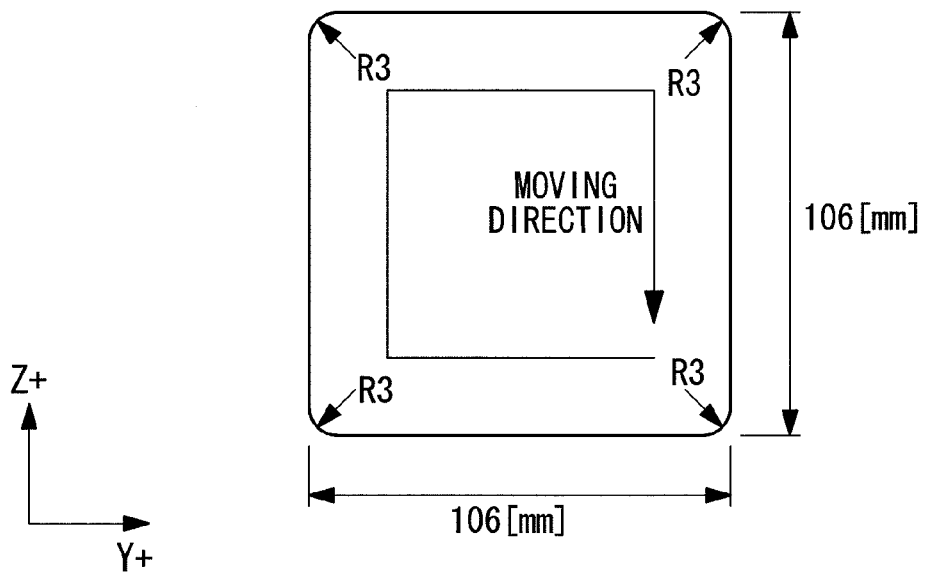
FIG. 7 is a diagram for explaining an impact that an impact generating section applies to a carriage.

In the rectangular shape shown in FIG. 7, each corner portion is set to be an arc having a predetermined curvature. The impact generating section 52 has a substantially rectangular movement track on the Y-Z plane as shown in FIG. 7, and, by giving the servo control device 100 shown in FIG. 2 a positioning command in accordance with this movement track, the motor 12 is rotationally driven, and the carriage 5 is moved along the movement track shown in FIG. 7. An allowable acceleration of the moving velocity of the carriage 5 during this time is preferably set to 0.2 G or above. In this embodiment, the carriage 5 is moved at a velocity of 4600 mm/min and an impact whose acceleration is between 0.2 G and 0 G is generated at a transition from an arc with a 3-mm radius to a linear section.

In the servo control for identifying the machine constants, the machine-deflection compensating section 200 and the column-reaction-force compensating section 311 in the servo control device 100 are set to the off state so that the machine-deflection compensation, the column-reaction-force compensation, etc. are not performed.

The acceleration sensor 52 is mounted on the column 3 or the carriage 5, detects the vibrations of the carriage 5 due to the impact applied to the carriage 5 by the impact generating section 51, and outputs this detected signal to the column-stiffness identifying section 53 and the column-viscosity identifying section 54.

When the impact is applied to the carriage 5 by the impact generating section 51, the column-stiffness identifying section 53 determines the column resonance frequency q from the detected signal acquired by the acceleration sensor 52 and identifies the column stiffness $K_C$ by substituting it into the above-described expression (21).

When the impact is applied to the carriage 5 by the impact generating section 51, the column-viscosity identifying section 54 determines an attenuation rate of the vibrations from the detected signal acquired by the acceleration sensor 52 and identifies the column viscosity $C_C$ on the basis of this attenuation rate. An identification method of the column viscosity $C_C$ will be described below using FIG. 8.

Figure 8:
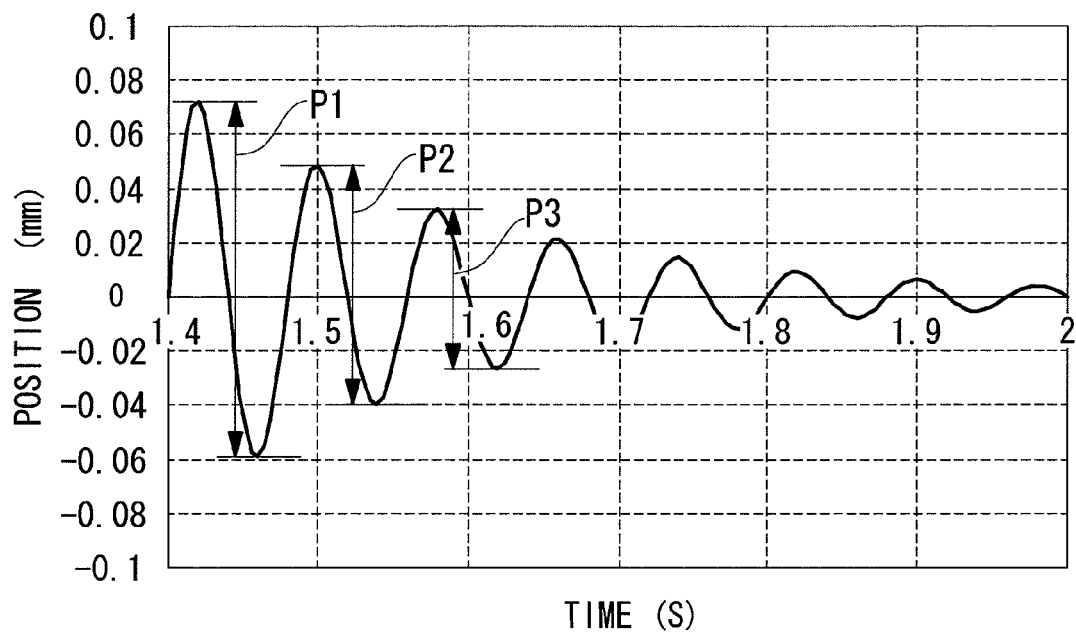
FIG. 8 is a diagram for explaining a method of identifying the column viscosity.

When attenuating vibrations as shown in FIG. 8 are obtained, amplitudes P1, P2, P3 . . . of the vibrations are individually measured. Subsequently, an average δ of logarithmic decrements is calculated from these amplitudes P1, P2, P3 . . . . For example, when four waves are taken as referents, an average of LN(P1/P2), LN(P2/P3), and LN(P3/P4) is calculated and the average δ of the logarithmic decrements is determined. Then, the column viscosity $C_C$ is calculated from the following expression using the logarithmic decrement δ, the column inertia $J_C$, and the column stiffness $K_C$ identified by the above-described column-stiffness identifying section 53.

$$C_C = \delta * SQRT(J_C * K_C)/\pi$$

The machine-constant setting section 55 sets the column stiffness $K_C$ identified by the column-stiffness identifying section 53 and the column viscosity $C_C$ identified by the column-viscosity identifying section 54 in the machine-deflection compensating section 200 and the column-reaction-force compensating section 311 in the velocity feedforward section 201. The machine-constant setting section 55 which holds a table in which machine states, such as a W-axis position, attachment, etc., and the machine constants other than the above-described column stiffness $K_C$ and the column viscosity $C_C$ are associated with each other, reads out machine constants corresponding to machine states at a given time, and sets the individual read-out machine constants in the machine-deflection compensation section 200 and the column-reaction-force compensating section 311 in the velocity feedforward section 201.

Then, once all of the machine constants of the machine-deflection compensating section 200 and the column-reaction-force compensating section 311 in the velocity feedforward section 201 are set in this way, the servo control device 100 activates the machine-deflection compensating section 200 and the column-reaction-force compensating section 311 and performs positioning control using these compensation models.

As has been described above, with the servo control device according to this embodiment, not only the machine-deflection compensating section 200 that performs compensation for positioning-control errors due to the vibrations of the column 3, but also the column-reaction-force compensating section 311 that performs compensation for positioning-control errors due to vibrations of the carriage 5 caused by the reaction force of the column 3 is provided; therefore, the vibrations of the carriage 5 due to the reaction force of the column 3 can be compensated for, and positioning control of the carriage 5 can be performed at a high precision even when the column 3 is vibrating.

Figure 9:
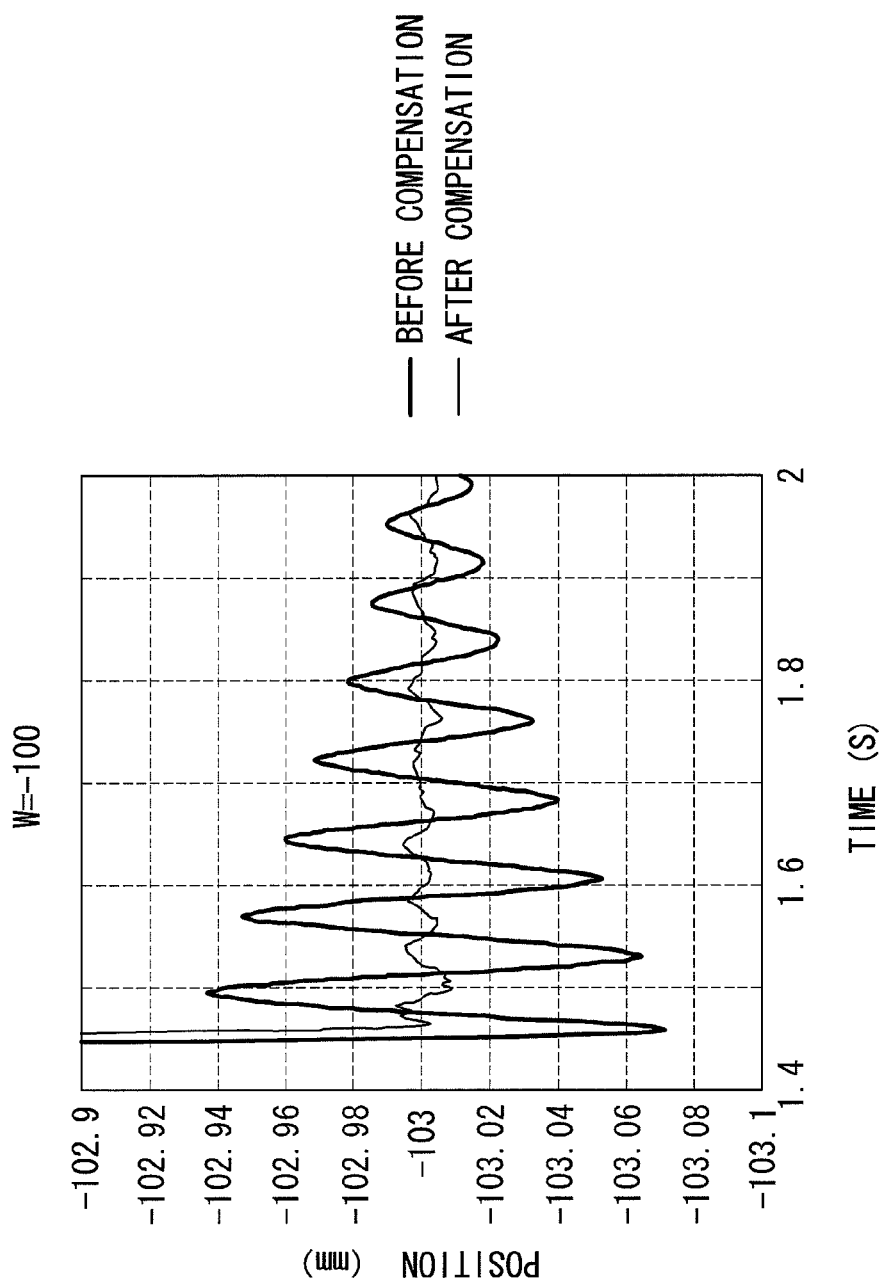
FIG. 9 is a diagram showing an effect of a compensating section according to the first embodiment of the present invention.

FIG. 9 is a graph showing precision of positioning control before performing compensation by the machine-deflection compensating section 200 and the column-reaction-force compensating section 311 and precision after performing the compensation. In FIG. 9, the vertical axis is the position of the ram tip in the Y-axis direction.

In this test, a jig (angle plate) having a thickness of 500 mm was disposed on a top surface of a table shown in FIG. 13, and a grid scale was disposed on the jig. In this state, the motor 12 was rotationally driven by giving the servo control device 100 shown in FIG. 2 positioning commands in accordance with the substantially rectangular movement track on the Y-Z plane as shown in FIG. 7, and the carriage 5 and the ram 6 were moved along the movement track shown in FIG. 7. In this test, the carriage 5 and the ram 6 were moved at a velocity of 4600 mm/min. FIG. 9 shows the ram tip position measured with the grid scale in such a test. FIG. 9 is a diagram showing a section of waveforms for motion of the ram tip until it stops after moving along the Y-axis and drawing an arc, wherein a position Y=−103 is the stop position (reference position). It is clear from FIG. 9 that, by performing the compensation, the vibrations of the carriage 5 and the ram 6 are effectively suppressed and the precision of the positioning control is improved.

Second Embodiment

As described above, even when constants of the machine-deflection compensating section 200 and the column-reaction-force compensating section 311 are set by the constant identifying section 50, it is conceivable that the set constants are not appropriate, that the carriage 5 still vibrates even when these compensating sections are activated, and that the precision of the positioning control is deteriorated.

Figure 10:
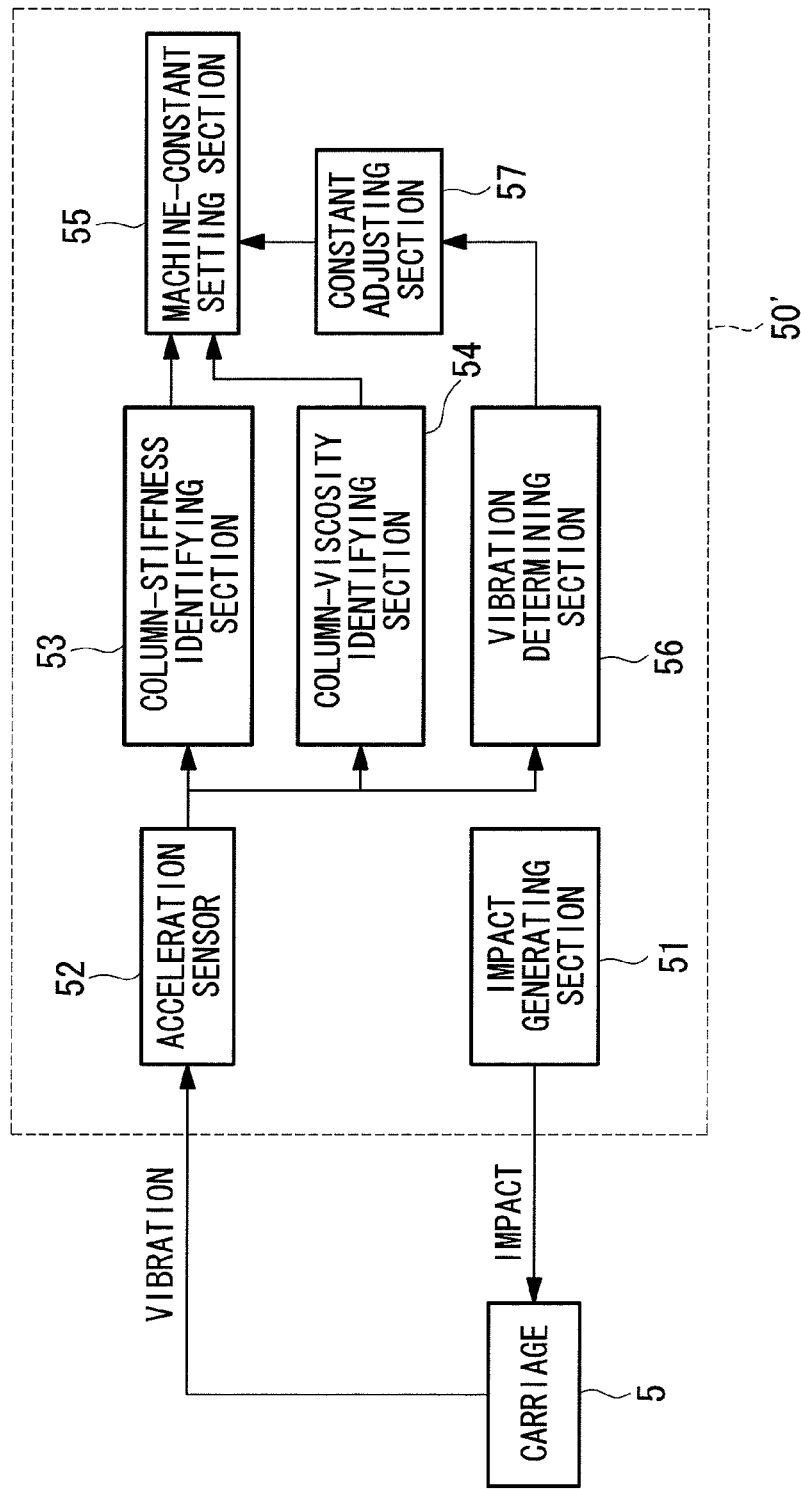
FIG. 10 is a diagram showing, in outline, the configuration of a constant identifying section according to a second embodiment of the present invention.

Therefore, in a servo control device according to a second embodiment, in order to check whether or not the constants that have already been set are appropriate, an impact in the Y-axis direction is applied to the carriage 5 by the impact generating section 51 in a state in which the machine-deflection compensating section 200 and the column-reaction-force compensating section 311 are activated, and the vibration conditions of the carriage 5 at this time are checked using a detected signal from the acceleration section 52. When amplitudes of the vibrations in the detected signal from the acceleration section 52, in this case, exceed a predetermined threshold, the machine constants that have already been set are adjusted. Accordingly, as shown in FIG. 10, a constant identifying section 50' of the servo control device according to the second embodiment is additionally provided with a vibration determining section 56 and a constant adjusting section 57.

When the vibration determining section 56 determines that the amplitudes of the vibrations of the carriage 5 based on the detected signal from the acceleration sensor 52 exceed the predetermined threshold, the constant adjusting section 57 adjusts the machine constants that have already been set by the machine-constant setting section 55. Specifically, when vibrations immediately after an impact is applied are relatively large, the constant adjusting section 57 applies changes in a direction that increases the column viscosity $C_C$, and, when the vibrations become relatively large some time after the impact is applied, the machine constants are adjusted by changing a compensation frequency. Then, when the machine constants are changed, the adjustment of the machine constants is repeated by performing the same procedure again until it is determined by the vibration determining section 56 that the amplitudes of the vibrations of the carriage 5 are at or below the predetermined threshold.

In this way, the servo control device according to this embodiment possesses means to check whether or not the machine constants that have already been set are appropriate, and the adjustment of the machine constants is repeated until a determination result that the machine constants are appropriate is obtained; therefore, the precision of positioning control of the carriage 5 can be improved.

In this embodiment, it is necessary to mount the acceleration sensor 52 on the carriage 5. This is because the column 3 still vibrates, although the precision of positioning control of the carriage 5 is improved by activating the machine-deflection compensating section 200 and the column-reaction-force compensating section 311. Therefore, if the acceleration sensor 52 is attached to the column 3, effects of the positioning compensation by the machine-deflection compensating section 200 and the column-reaction-force compensating section 311 cannot be checked, and thus, it is also not possible to determine whether or not the machine constants are appropriate.

Third Embodiment

In the first embodiment and the second embodiment described above, the carriage 5 is intentionally vibrated by applying an external impact thereto, and the machine constants are identified on the basis of the conditions of these vibrations.

As opposed to this, this embodiment assumes a state in which the machine constants have already been set, and the machine constants are gradually adjusted when the precision of positioning control is deteriorating in a state in which positioning control by the servo control device is being performed, in other words, in a state in which the machine tool is being driven.

Figure 11:
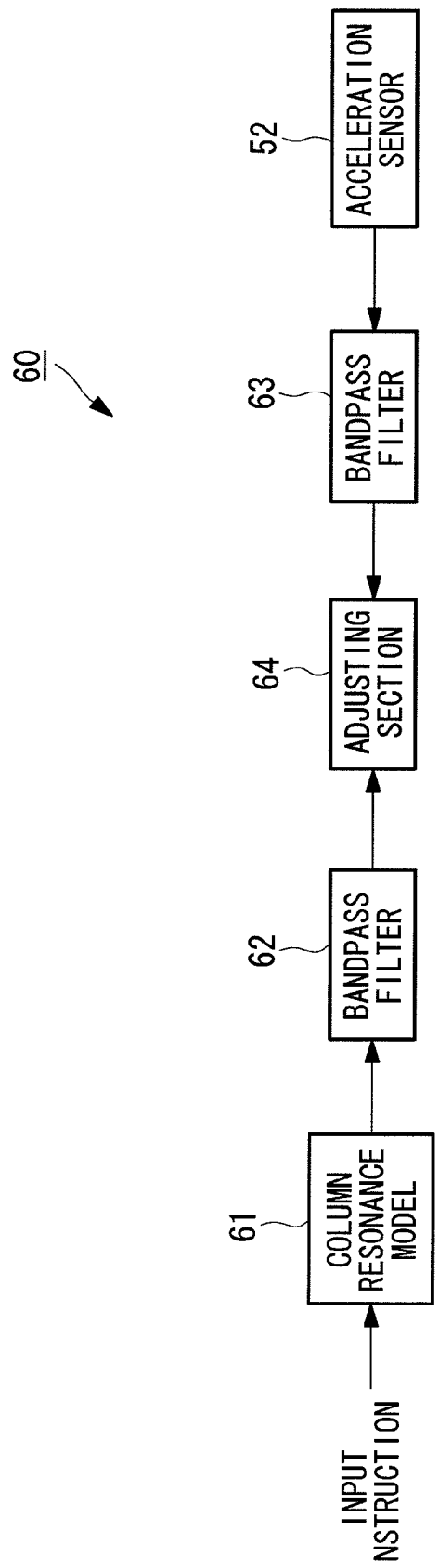
FIG. 11 is a diagram showing, in outline, the configuration of a machine-constant adjusting section according to a third embodiment of the present invention.

Specifically, the servo control device according to this embodiment is provided with a machine-constant adjusting section 60. As shown in FIG. 11, the machine-constant adjusting section 60 is provided with a column resonance model 61 to which the instructed position θ is input, a bandpass filter 62 that filters the instructed position θ that has been compensated for by the column resonance model 61, a bandpass filter 63 that filters a signal from the acceleration sensor 52, an adjusting section 64 that compares the signals that have passed through the bandpass filters 62 and 63 and that adjusts the machine constants until a difference therebetween is eliminated.

Figure 12:
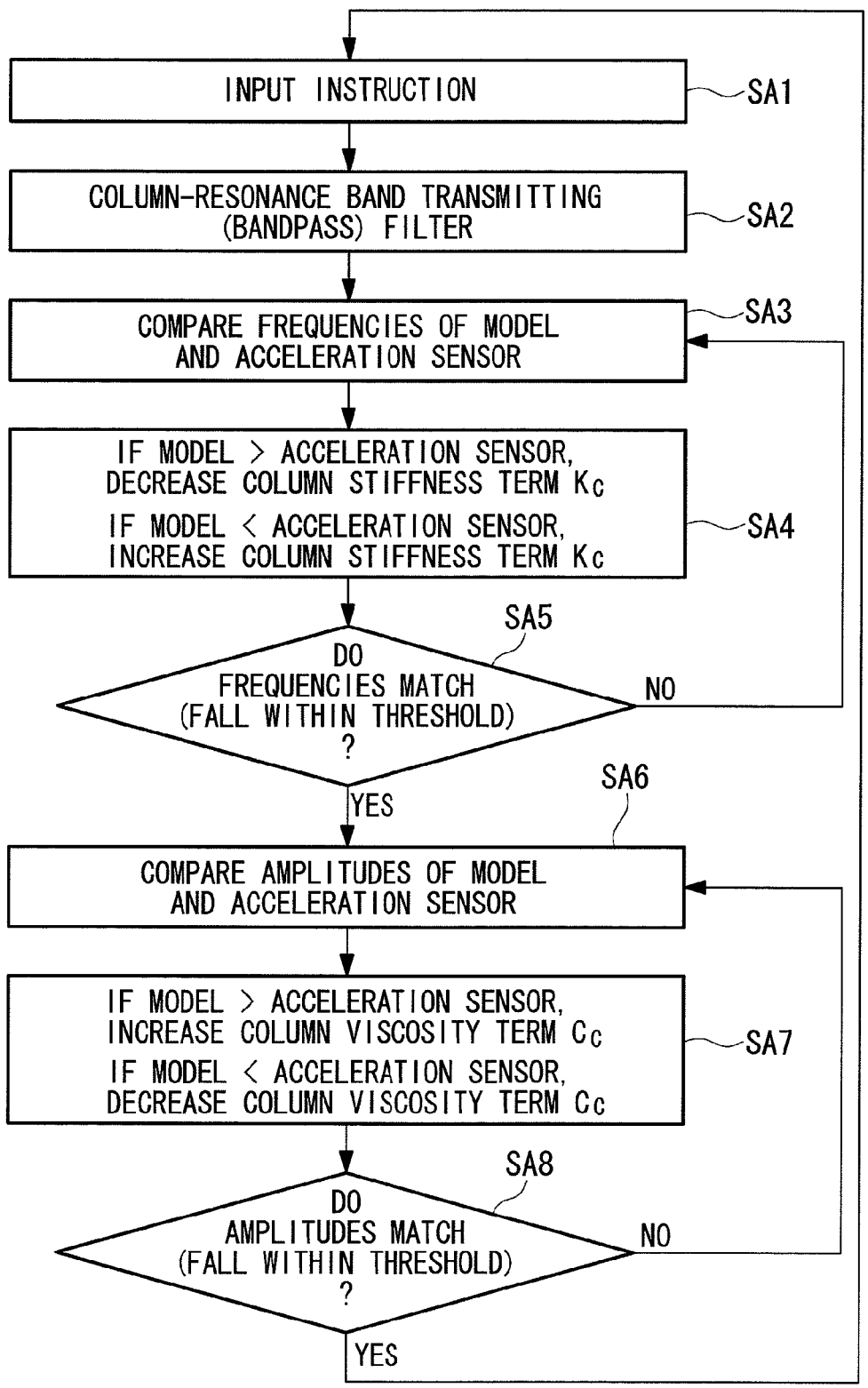
FIG. 12 is a flowchart for explaining specifics of processing executed in the machine-constant adjusting section shown in FIG. 11.

With such a machine-constant adjusting section 60, upon receiving the instructed position θ (Step SA1 in FIG. 12), the instructed position θ is filtered by the bandpass filter 62 after passing through the column resonance model 61 and is output to the adjusting section 64 (Step SA2 in FIG. 12). On the other hand, the detected signal of vibrations from the acceleration sensor 52 is output to the adjusting section 64 after passing through the bandpass filter 63. At the adjusting section 64, a frequency of the signal from the column resonance model 61 side and a frequency of the signal from the acceleration sensor 52 side are compared (Step SA3 in FIG. 12).

As a result, when the frequency of the signal from the column resonance model 61 side is larger than the frequency of the signal from the acceleration sensor 52 side, the adjusting section 64 decreases the column stiffness $K_C$ by a predetermined amount. On the other hand, when the frequency of the signal from the column resonance model 61 side is smaller than the frequency of the signal from the acceleration sensor 52 side, the adjustment 64 increases the column stiffness $K_C$ by a predetermined amount (Step SA4 in FIG. 12). The adjusting section 64 repeats the adjustment of the column stiffness $K_C$ as described above until it is determined that the two frequencies match each other or a difference between the two frequencies is within a predetermined threshold (Step SA5 in FIG. 12).

Next, when it is determined that the two frequencies match each other, the amplitudes of the two are subsequently compared at the adjusting section 64 (Step SA6 in FIG. 12). As a result, when the amplitudes of the signal from the column resonance model 61 are larger than the amplitudes of the signal from the acceleration sensor 52, the adjusting section 64 increases the column viscosity $C_C$ by a predetermined amount. On the other hand, when the amplitudes of the signal from the column resonance model 61 are smaller than the amplitudes of the signal from the acceleration sensor 52, the adjusting section 64 decreases the column viscosity $C_C$ by a predetermined amount (Step SA7 in FIG. 12). The adjusting section 64 repeats the adjustment of the column viscosity $C_C$ as described above until it is determined that the two amplitudes match each other or a difference between the two amplitudes is within a predetermined threshold (Step SA8 in FIG. 12).

Then, when it is determined that the two amplitudes match each other, the processing returns to Step SA1 and the above-described processing is repeated.

As has been described above, with the servo control device according to this embodiment, whether or not the machine constants in the machine-deflection compensating section 200 and the column-reaction-force compensating section 311 are set to appropriate values is checked at certain time intervals even during a normal driving state, and, if not appropriate, adjustments to appropriate values are performed; therefore, it is possible to constantly maintain the precision of positioning control of the carriage 5 at or above a predetermined precision.

REFERENCE SIGNS LIST

3 column
5 carriage
6 ram
9 ball-screw feeding section
10 ball-screw nut
11 ball-screw shaft
12 motor
13 motor encoder
14 linear scale
50, 50' constant identifying section
51 impact generating section
52 acceleration sensor
53 column-stiffness identifying section
54 column-viscosity identifying section
55 machine-constant setting section
56 vibration determining section
57 constant adjusting section
60 machine-constant adjusting section
61 column resonance model
62, 63 bandpass filter
64 adjusting section
100 servo control device
200 machine-deflection compensating section
201 velocity feedforward section
311 column-reaction-force compensating section

The invention claimed is:

1. A servo control device that is applied to a numerical control equipment provided with a screw-feeding section that converts rotational movement of a motor to linear movement, a driven section that is linearly moved by the screw-feeding section, and a support member by which the screw-feeding section and the driven section are supported; and that is configured to control the motor so as to match a position of the driven section to an instructed position, comprising:
    a machine-deflection compensating section, to which the instructed position is input as input information, and which is configured to compensate for positioning-control errors caused by vibrations of the support member, and to output a compensated instructed position; and
    a velocity feedforward section, to which the compensated instructed position is input;
    wherein the velocity feedforward section includes
    a support-member-reaction-force compensating section that is configured to compensate for vibrations of the driven section due to vibrational reaction force of the support member, and
    wherein a differential value of the compensated instructed position, as input information, is input to a transfer function, which is provided in the support-member-reaction-force compensating section and includes coefficients based on an inertia term for the support member, an inertia term for the driven section, a stiffness term for the support member, and a stiffness term for the driven section.

2. A servo control device according to claim 1, further comprising an instructed velocity calculation section that is configured to calculate an instructed velocity, which is a value obtained by: a velocity difference based on a difference between the compensated instructed position output from the machine-deflection compensating section and a load position; an output from the velocity feedforward section; and a velocity of the motor.

3. A servo control device according to claim 1, wherein the transfer function provided in the support-member-reaction-force compensating section includes a stiffness term for the support member, and the stiffness term of the support member is identified on the basis of a vibration resonance frequency of vibrations generated when an impact is applied to the support member or the driven section.

4. A control device according to claim 3, comprising a constant identifying section that is configured to identify the stiffness term for the support member,
    wherein the constant identifying section includes:
    an impact generating section that is configured to vibrate the driven section by applying an impact to the driven section;
    a vibration detecting section that is configured to detect the vibrations of the driven section or the support member when the impact is applied thereto; and
    a support-member-stiffness-term identifying section that is configured to calculate a resonance frequency of the driven section from a vibration signal detected by the vibration detecting section and to identify the stiffness term for the support member from this resonance frequency.

5. A servo control device according to claim 1, wherein the transfer function provided in the support-member-reaction-force compensating section includes a coefficient based on a viscosity term for the support member; and configured to identify the viscosity term of the support member on the basis of attenuation of the vibrations generated when the support member or the driven section is vibrated by applying an impact thereto.

6. A servo control device according to claim 5, comprising a constant identifying section that is configured to identify the viscosity term for the support-member-reaction-force compensating section, wherein the constant identifying section includes:
an impact generating section that is configured to vibrate the driven section by applying an impact to the driven section;
a vibration detecting section that is configured to detect the vibrations of the driven section or the support member when the impact is applied thereto; and
a support-member-viscosity-term identifying section that is configured to calculate an attenuation rate of the vibrations of the driven section from a vibration signal detected by the vibration detecting section and to identify the viscosity term for the support member from the attenuation rate of the vibrations.

7. A servo control device according to claim 4, wherein the impact generating section is configured to vibrate the driven section by moving the driven section with a predetermined acceleration or above.

8. A servo control device according to claim 4, wherein, when amplitudes of the vibrations of the driven section detected by the vibration detecting section exceed a predetermined threshold after the stiffness term for the support member is identified, the constant identifying section is configured to adjust the stiffness term for the support member on the basis of the vibration signal detected by the vibration detecting section.

9. A servo control device according to claim 8, wherein, during a period in which the numerical control equipment is being driven, the constant identifying section is configured to compare the vibration signal detected by the vibration detecting section with an estimated vibration signal calculated from a model in the support-member-reaction-force compensating section and is configured to adjust the stiffness term for the support member on the basis of this comparison.

10. A servo control device according to claim 2, wherein the transfer function provided in the support-member-reaction-force compensating section includes a stiffness term for the support member, and the stiffness term of the support member is identified on the basis of a vibration resonance frequency of vibrations generated when an impact is applied to the support member or the driven section.

11. A servo control device according to claim 2, wherein the transfer function provided in the support-member-reaction-force compensating section includes a coefficient based on a viscosity term for the support member; and configured to identify the viscosity term of the support member on the basis of attenuation of the vibrations generated when the support member or the driven section is vibrated by applying an impact thereto.

12. A servo control device according to claim 6, wherein the impact generating section is configured to vibrate the driven section by moving the driven section with a predetermined acceleration or above.

13. A servo control device according to claim 4, wherein, when amplitudes of the vibrations of the driven section detected by the vibration detecting section exceed a predetermined threshold after the viscosity term for the support member is identified, the constant identifying section is configured to adjust the viscosity term for the support member on the basis of the vibration signal detected by the vibration detecting section.

14. A servo control device according to claim 13, wherein, during a period in which the numerical control equipment is being driven, the constant identifying section is configured to compare the vibration signal detected by the vibration detecting section with an estimated vibration signal calculated from a model in the support-member reaction-force compensating section and to adjust the viscosity term for the support member on the basis of this comparison.

\* \* \* \* \*